Jan. 21, 1964   F. R. BROWN ETAL   3,118,396
MACHINE FOR MAKING CANDY
Filed April 9, 1962   2 Sheets-Sheet 1

Inventors:
Frank R. Brown, Irwin J. Grabel
and Sherman Rubenstein
BY ROBERT L. KAHN ATTY.

Jan. 21, 1964 F. R. BROWN ETAL 3,118,396
MACHINE FOR MAKING CANDY
Filed April 9, 1962 2 Sheets-Sheet 2
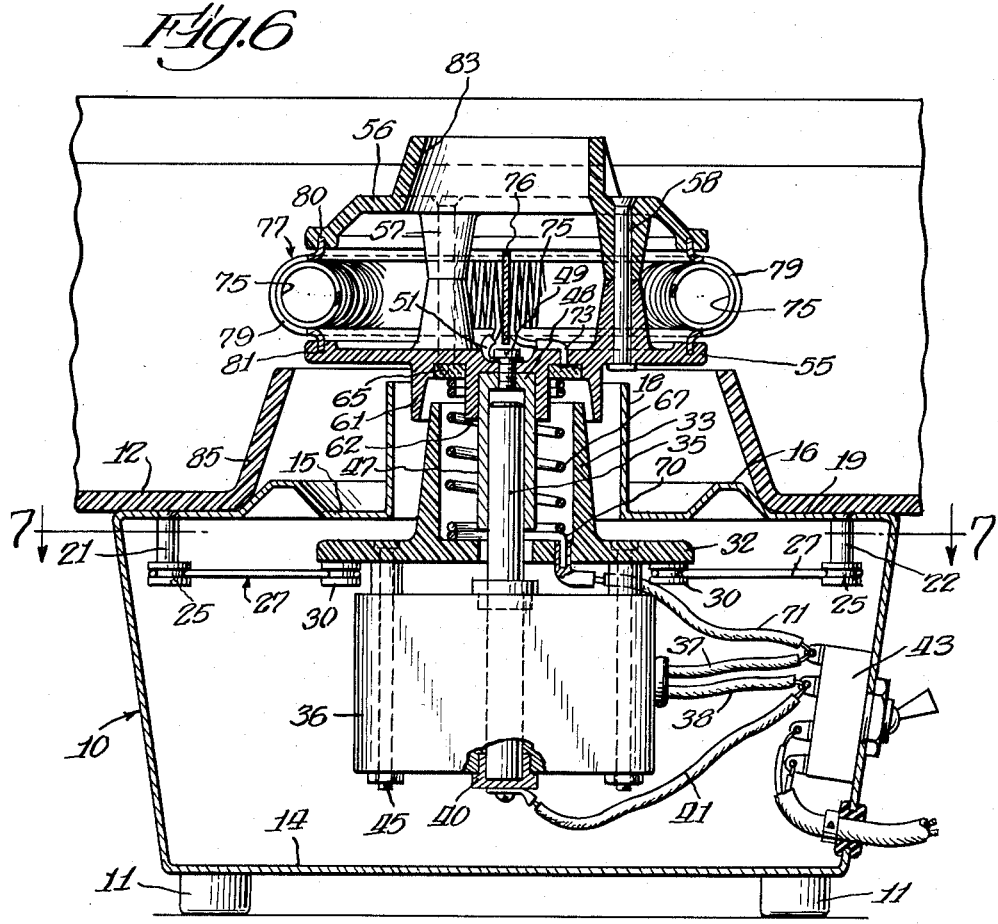
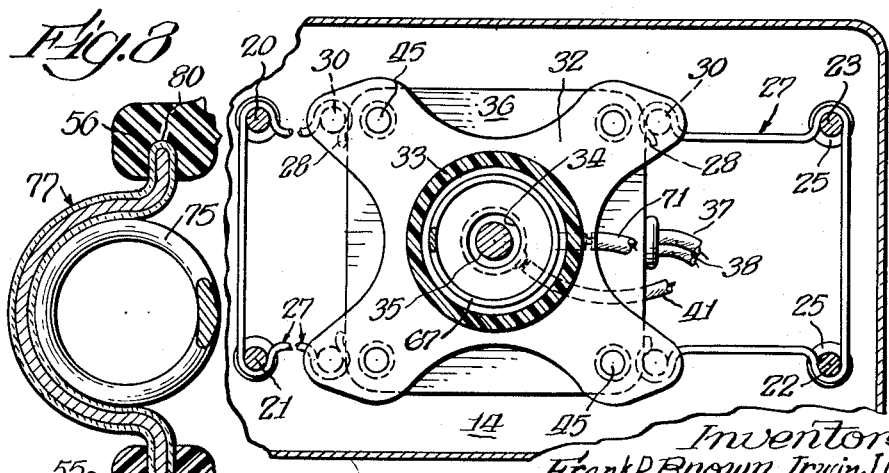
Inventors:
Frank R. Brown, Irwin J. Grabel
and Sherman Rubenstein
BY ROBERT L. KAHN ATTY.

United States Patent Office 3,118,396
Patented Jan. 21, 1964

3,118,396
MACHINE FOR MAKING CANDY
Frank R. Brown, Des Plaines, Irwin J. Grabel, Chicago, and Sherman Rubenstein, Skokie, Ill., assignors to Premium Engineering Co., Inc., Chicago, Ill., a corporation of Illinois
Filed Apr. 9, 1962, Ser. No. 185,922
13 Claims. (Cl. 107—8)

This invention relates to a machine for making candy. The machine forming the subject matter of the present application utilizes cane sugar and makes so called cotton candy. The machine embodying the present invention is simple, economical to tool and manufacture and is effective for use by children and grownups in connection with making cotton candy. In order that the invention may be understood, reference will be made to the drawings wherein:

FIGURE 6 is a sectional elevation showing the machine as illustrated in FIGURE 1.

FIGURE 7 is a sectional view on line 7—7 of FIGURE 6.

FIGURE 8 is a sectional detail on line 8—8 of FIGURE 3.

Figure 1:
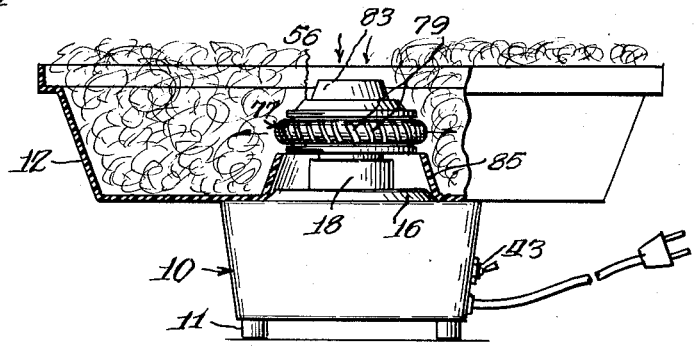
FIGURE 1 is a side elevation with some parts broken away showing the new machine.
Figure 2:
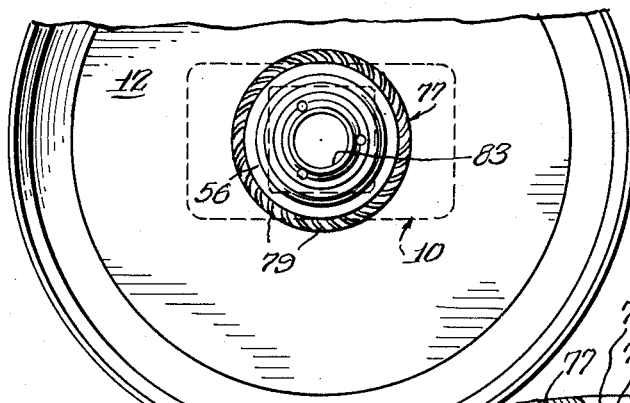
FIGURE 2 is a partial view looking down upon the top of the machine of FIGURE 1.

The machine comprises combined housing and base 10 provided with legs 11, the housing supporting bowl 12. Housing 10 is preferably made of moulded plastic material and has bottom wall 14 and top wall 15. Top wall 15 of the housing is provided with upwardly extending annular portion 16 for centering bowl 12 thereon. Top wall 15 of the housing has at its inner edge upwardly extending sleeve 18. The entire housing may be made of separate pieces, cemented together, or moulded as a single unit.

Top wall 15 of the housing has peripheral portion 19 from which depend four supporting posts 20 to 23 inclusive. As illustrated in FIGURE 6, each of these posts has the bottom end portion grooves at 25. The posts are preferably integral with the housing and are adapted to support the mechanism making up the machine. As illustrated in FIGURE 7, posts 22 and 23 have disposed in grooves 25 thereof wire spring support 27 whose ends are curled at 28 for engaging grooved bosses 30 forming part of a motor mounting plate. Two springs 27 are provided on opposite sides of the machine and bosses 30 are four in number and are arranged in a generally rectangular pattern. This arrangement provides a flexible and economical spring suspension.

Bosses 30 are part of motor mounting plate 32 preferably of plastic or electrical insulating material. Plate 32 has upwardly extending sleeve 33 which is inside of but spaced from sleeve 18 of the housing plate. Motor plate 32 is apertured at 34 to accommodate vertical steel shaft 35 of electric motor 36. Sleeves 18 and 33 and aperture 34 are generally concentric. Electric motor 36 is preferably of the induction type, this motor having a conventional stator with windings and a rotor which may be of the squirrel cage type or of the permanent magnet type and in any event not requiring any brushes. Electric motor 36 has leads 37 and 38 for conducting current thereto, it being understood that the current is alternating in character and will usually be at 60 cycles.

Motor 36 is generally conventional except for the following particulars. Shaft 35 has its bottom free end supported in thrust bearing 40. Bearing 40 may be of any suitable type but preferably is of the type having a porous bronze body impregnated with graphite. At any rate, bearing 40 has at least part thereof made of electrically conducting material and constitutes one terminal for supplying current to a load. Bearing 40 has wire 41 connected thereto and for convenience wire 41 and wire 38 may be connected together to one terminal of On-Off switch 43. Motor 36 is secured to insulating motor plate 32 by bolts 45 extending from the plate through the motor and nuts for the bolts.

Shaft 35 extends upwardly through opening 34 in the motor plate and has disposed over it, as by a press fit, metal sleeve 47. Sleeve 47 may be of steel or brass and is forced over shaft 35 so that a tight, good electrical contact between the steel shaft and the sleeve will result. For practical purposes, sleeve 47 may be considered as part of the motor shaft. Sleeve 47 has its top end 48 closed and has a threaded aperture therethrough for accommodating terminal screw 49. Terminal screw 49 is concentric with shaft 35 and serves to clamp terminal 51 (FIGURE 6) in position.

Figure 4:
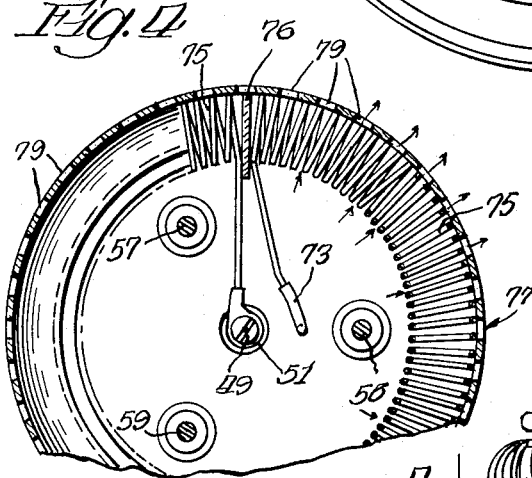
FIGURE 4 is a sectional view on line 4—4 of FIGURE 3.
Figure 5:
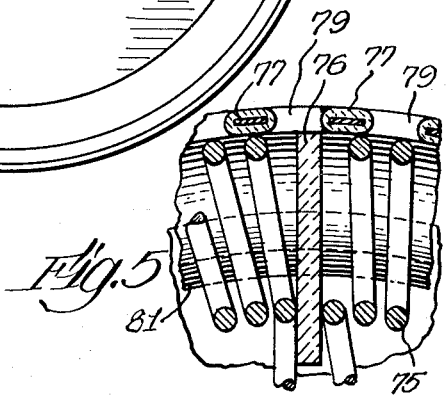
FIGURE 5 is an enlarged detail with certain parts in section showing the relationship of the spring wire and support.
Figure 3:
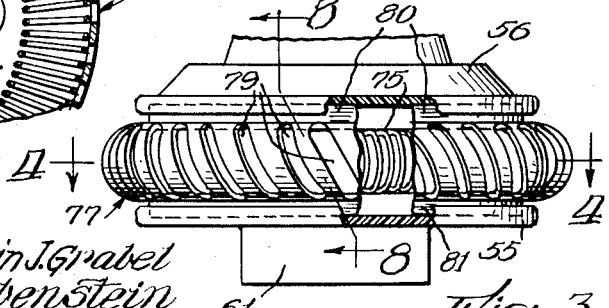
FIGURE 3 is an enlarged detail with certain parts broken away illustrating the portion of the machine through which the melted cane sugar is expelled to form cotton candy.

Terminal screw 49 also serves to retain a superstructure part of the machine in position. The superstructure part is generally bowl-shaped and comprises bottom plate 55 preferably of electrically insulating material and top plate 56 of similar material riveted together at regions 57, 58 and 59 (FIGURE 4). At these regions bosses extend inwardly toward each other from the two opposed plate portions and accommodate rivets or other fastening means for maintaining the two plates together. A suitable material that can be used is nylon, which can withstand the moderately elevated temperature at which the device is to operate. Instead of this material, however, top and bottom plates 56 and 55 may be made of other materials such as Delrin, Bakelite or any other plastic materials available on the market, or even of metal.

Bottom plate 55 has downwardly extending flange 61 which is so dimensioned as to lie between sleeves 33 and 18. Flange 61 is long enough so that its bottom free edge extends below the top free edge of sleeve 33. Preferably sleeve 18 of the housing has a top free edge well above the bottom free edge of flange 61.

Bottom plate 55 has inner flange portion 62 which snugly fits over the end of metal sleeve 47. At the annular region of bottom plate 55 between flanges 61 and 62 there is disposed washer 65 of graphite impregnated bronze. Disposed against the free face of bronze washer 65 is the end of helical spring 67 of brass or Phosphor bronze. The end turns of spring 67 preferably are closely packed. It is understood that the washer rotates with the electric motor while spring 67 remains stationary. Spring 67 has its bottom end 70 pass through a suitable opening in motor plate 32 and is connected to wire 71 which is connected together with wire 37 to the other terminal of switch 43.

Soldered or otherwise secured to the top blind face of bronze washer 65 is lead 73 going to one end of heating coil 75. Lead 73 passes through an opening in bottom plate 55. Terminal 51 goes to the other end of heating coil 75. Heating coil 75 consists of a helical wire element curved to form a toroid. The opposing end coils of the heating coil are separated by insulating spacer wall 76 disposed between bottom and top plates 55 and 56. Insulating spacer wall 76 may be of mica or any suitable material capable of withstanding high temperature. It can be pressed into slots moulded in plate 55 or can be moulded as an integral part of bottom plate 55.

The heating element itself is of conventional construction and may be of Nichrome and has adjacent turns spaced apart no more than about ten or fifteen-thousandths of an inch. The heating element is so designed that the wire temperature is about 250° F. This is generally sufficient to melt the sugar. In any event, the heating coil wire is operated at such a low temperature that the wire retains its spring characteristic. Because of this, the heating coil will tend to straighten out from its toroidal shape. Heating coil 75 is maintained in position by suitable means engaging the outer portion of the toroid. As illustrated here, the heating coil is maintained in position by shroud 77 which may be made of sheet steel covered with a heavy heat resistant enamel so that the coils of the heating element will not be short circuited. Shroud 77 is provided with slots 79, which are here shown as skewed. The openings provided by the shroud should be substantially larger than the space between adjacent turns of the heating coil and may as an example, be about 1/16" along one dimension. Thus slots 79 may have a width of about 3/64", or even larger, and extend laterally of the shroud for a maximum distance but leaving the top and bottom edges of the shroud strong enough to hold the entire shroud together.

Shroud 77 has top and bottom edges 80 and 81 disposed in slots in the edges of top and and bottom plates 56 and 55. The objective is simply to provide mechanical support for the heating coil and at the same time permit the candy to emerge. Top plate 56 has neck 83 which gives access to the region within the two plates. Stationary bowl 12 has extending from the bottom, inner upwardly extending portion 85 which stops near but is short of the edge of plate 55.

Bowl 12 will clear plates 55 and 56 and may be removed for washing and is adapted to receive the cotton candy produced by the machine. Cane sugar is poured into neck 83.

When the machine is operating, the motor will spin the superstructure and at the same time heating coil 75 will be hot. Centrifugal force drives the sugar crystals to the heating coils where the same will be melted and centrifugal force will throw the molten sugar through the coils of the heating element and through slots 79 of the shroud. Resistance wire making up heating coil 75 is so selected as to provide the right amount of heat. Heating current will pass through the shaft of the motor, through heating coil 75 to the top face of graphite impregnated bronze washer 65, thence to stationary spring 67 back to the supply line. The arrangement of sleeves and flanges 18, 33 and 61 is such that there will be substantially no tendency for any impurities or sugar to get into the region occupied by spring 67. It is understood that the space between sleeve 47 and flange 33 is large enough to permit spring 67 to be clear of rotating metal sleeve 47.

What is claimed is:

1. A machine for making candy comprising a base, a rotatable vertical metallic shaft supported by said base, an electric motor for rotating said shaft, a wiping metal contact for the lower portion of said shaft, a rotatable superstructure coupled to the top of said shaft for turning with said shaft, said superstructure including a rotatable washer of graphite impregnated bronze, an electric heating element carried by said superstructure, said heating element having two terminals, means for connecting one heating element terminal to the top end of said shaft, means for connecting the other heating element terminal to one face of said washer, said washer being insulatingly supported by said superstructure to rotate therewith in concentric relation to the top portion of the rotatable shaft, said washer having its other face accessible, a stationary helical metallic spring disposed in concentric relation to the upper portion of said shaft with one end of said spring pressing against said accessible washer face, the other end of said spring constituting a terminal for connection to one side of a source of electric power with the other side of said source of electric power being connected to the contact at the lower portion of said shaft.

2. The machine according to claim 1 wherein said superstructure includes a generally bowl-shaped portion with said electric heating element being in the shape of a toroid and consisting of a helical coil spring with the helix bent to form the toroid.

3. The construction according to claim 2 wherein said bowl-shaped structure consists of two portions spaced from each other with the heating coil disposed therebetween, adjacent coils of the heating coil being spaced no more than about .015" apart, said heating coil permitting cane sugar crytals to be melted and passed through the heating coil for making cotton candy.

4. The construction according to claim 3 wherein said superstructure includes a stationary annular dish disposed beyond the heating coil and adapted to receive the cotton candy passing through the heating coil.

5. The construction according to claim 4 wherein said superstructure includes an enameled steel shroud for the heating coil, said shroud supporting the heating coil and having openings through which material can pass from the interior of the superstructure to the exterior thereof.

6. The construction according to claim 5 wherein said superstructure includes two plates rigidly secured to each other, said plates having spaced portions between which the shroud and heating coil are disposed.

7. A candy making machine comprising a housing, a brushless electric motor having a metallic shaft adapted to rotate during motor energization, means for supporting said motor so that said shaft is vertical with a free top portion extending above and beyond the motor, means cooperating with the bottom of said shaft for conducting electric current from a stationary wire to said shaft, an insulating plate secured to rotate with said shaft, a washer of graphite impregnated bronze supported by said insulating plate and disposed around said shaft and having a free face looking toward the motor, a stationary metallic helical spring concentric with but spaced from the free portion of said shaft, means for supporting said spring so that the top end thereof presses against the free face of said washer, the bottom of said spring providing a terminal for conducting electric current to the rotating washer, said insulating plate having a bowl-shaped construction for holding a quantity of sugar, said bowl-shaped construction including an outwardly curved annular shroud of material having an electrically insulating heat resistant outer surface with passages therethrough so that sugar in said whirling construction can work its way outwardly through the shroud, an electric heating element disposed at the inside curved portion of said shroud for heating said sugar as it passes therethrough, means for electrically connecting the ends of said heating element to said shaft and to said washer respectively, and means supported by said housing for collecting sugar passing through the rotating construction.

8. A candy making machine comprising a housing, a brushless electric motor having a metallic shaft adapted to rotate during motor energization, means for supporting said motor so that said shaft is vertical with a free top portion extending above and beyond the motor, said motor support means including an insulating motor mounting plate adjacent the top end of the motor and having an upwardly extending sleeve spaced from but surrounding a substantial portion of the free top portion of the motor shaft, means cooperating with the bottom of said shaft for conducting electric current from a stationary wire to said shaft, an insulating plate secured to rotate with said shaft, said insulating plate having a first downwardly extending flange around a portion of said shaft, a washer of graphite impregnated bronze for said insulating plate disposed around said first flange and having a free face looking toward the motor, said insulating plate having an outer flange extending downwardly therefrom with the washer being between the two flanges, a stationary metallic helical spring concentric with but spaced from the free portion of said shaft, said spring lying within the motor mounting plate sleeve, said spring being supported on the motor mounting plate concentric with but spaced from the shaft, the top end of said spring bearing against the free face of said washer, the bottom of said spring providing a terminal for conducting electric current to the rotating washer, said insulating plate having a bowl-shaped construction for holding a quantity of cane sugar, said bowl-shaped construction including an outwardly curved annular support structure having passages therethrough and of material having an electrically insulating heat resistant outer surface so that cane sugar in said whirling construction can work its way outwardly through the passages, an electric heating element disposed at the inside curved portion of said support structure for heating said sugar as it passes therethrough, means for electrically connecting the ends of said heating element to said shaft and to said washer respectively, and means supported by said housing for collecting sugar passing through the rotating construction.

9. A candy making machine comprising a housing, a brushless electric motor having a metallic shaft adapted to rotate during motor energization, means for supporting said motor so that said shaft is vertical with a free top portion extending above and beyond the motor, said motor support means including an insulating motor mounting plate adjacent the top end of the motor and having an upwardly extending sleeve spaced from but surrounding a substantial portion of the free top portion of the motor shaft, means cooperating with the bottom of said shaft for conducting electric current from a stationary wire to said shaft, an insulating plate secured to rotate with said shaft, said insulating plate having a first downwardly extending flange around a portion of said shaft, a washer of graphite impregnated bronze for said insulating plate disposed around said first flange and having a free face looking toward the motor, said insulating plate having an outer flange extending downwardly therefrom with the washer being between the two flanges, a stationary metallic helical spring concentric with but spaced from the free portion of said shaft, said spring lying within the motor mounting plate sleeve, said spring being supported on the motor mounting plate concentric with but spaced from the shaft, the top end of said spring bearing against the free face of said washer, the bottom of said spring providing a terminal for conducting electric current to the rotating washer, said insulating plate having a bowl-shaped construction for holding a quantity of cane sugar, said bowl-shaped construction including an outwardly curved support of open material having an electrically insulating heat resistant outer surface so that cane sugar in said whirling construction can work its way outwardly through the support, an electric heating element disposed at the inside curved portion of said support for heating said sugar as it passes therethrough, means for electrically connecting the terminals of said heating element to said shaft and to said washer respectively, means supported by said housing for collecting sugar passing through the rotating construction, a top wall for said housing having an upwardly extending sleeve, the housing top wall sleeve being outside of said insulating plate outer flange, the free end of said housing top wall sleeve being above the free end of said outer flange, and above the free end of the mounting plate sleeve.

10. The construction according to claim 9 wherein the free end of the mounting plate sleeve is higher than the free end of the first flange.

11. The construction according to claim 9 wherein the motor supporting means includes spring wires locked in grooves of bosses carried by said housing and motor mounting plate.

12. The construction according to claim 9 wherein the heating element comprises a resistance wire in the form of a helix, the adjacent coils being spaced no more than about .015" and the helix being bent to form a toroid and wherein the heating element suport has openings substantially larger than the space between heater coils.

13. The construction according to claim 9 wherein the heating element support is of enamelled steel.

References Cited in the file of this patent

UNITED STATES PATENTS

| | | |
|---|---|---|
| 816,055 | Zoeller | Mar. 27, 1906 |
| 1,806,111 | Moad | May 19, 1931 |
| 3,036,532 | Bowe | May 29, 1962 |